(12) United States Patent
Zhu

(10) Patent No.: US 8,807,887 B2
(45) Date of Patent: Aug. 19, 2014

(54) DRILL BIT WITH HIGH PERFORMANCE FOR CHIP REMOVAL

(75) Inventor: Xiaokun Zhu, Danyang (CN)

(73) Assignee: Jiangsu Tiangong Tools Co., Ltd. (CN)

( * ) Notice: Subject to any disclaimer, the term of this patent is extended or adjusted under 35 U.S.C. 154(b) by 725 days.

(21) Appl. No.: 11/911,579

(22) PCT Filed: Feb. 6, 2006

(86) PCT No.: PCT/CN2006/000201
§ 371 (c)(1),
(2), (4) Date: Oct. 15, 2007

(87) PCT Pub. No.: WO2007/030983
PCT Pub. Date: Mar. 22, 2007

(65) Prior Publication Data
US 2008/0166196 A1    Jul. 10, 2008

(30) Foreign Application Priority Data
Sep. 14, 2005   (CN) ...................... 2005 2 0075503 U

(51) Int. Cl.
*B23B 51/02*   (2006.01)
(52) U.S. Cl.
CPC ............. *B23B 51/02* (2013.01); *B23B 2251/14* (2013.01); *B23B 2251/18* (2013.01); *B23B 2270/30* (2013.01); *B23B 2251/085* (2013.01)
USPC ............................. 408/223; 408/211; 408/230
(58) Field of Classification Search
USPC ........................... 408/211, 223–225, 227, 230
IPC .............................................. B23B 51/00,51/02
See application file for complete search history.

(56) References Cited

U.S. PATENT DOCUMENTS

| | | | | |
|---|---|---|---|---|
| 2,332,295 A | * | 10/1943 | Bouchal | 408/211 |
| 3,779,664 A | * | 12/1973 | Caley et al. | 408/225 |
| 4,285,620 A | * | 8/1981 | Luebbert et al. | 408/212 |
| 4,583,888 A | * | 4/1986 | Mori et al. | 408/59 |

(Continued)

FOREIGN PATENT DOCUMENTS

| | | | |
|---|---|---|---|
| CN | 2192422 Y | * | 2/1995 |
| DE | 10106035 A1 | * | 8/2002 |

(Continued)

OTHER PUBLICATIONS

Figure 2 of CN 2192422 Y that has been annotated by the examiner, one page, annotated Oct. 2011.*

*Primary Examiner* — Daniel Howell
(74) *Attorney, Agent, or Firm* — Schmeiser, Olsen & Watts LLP

(57) ABSTRACT

A drill bit with high performance for chip removal. The drill bit comprises a cutting tip and a drill body. The cutting tip comprises a chisel edge, a back edge, a cutting edge groove and a rear rib. The cutting edge groove is a circular groove having meniscus shape. A primary cutting surface interposed between the cutting edge groove and the back edge has a trapezoidal or triangular shape. Grinding the rear rib forms a quadratic rear plane. The quadratic rear plane crossing with the chisel edge and the cutting edge groove defines a cutting edge groove plane. The drill bit has three tips and seven cutting edges. A drill bit according to the present invention provides a significant improvement in cutting performance over known twist drill bit in the prior art.

2 Claims, 1 Drawing Sheet

(56) References Cited

U.S. PATENT DOCUMENTS

| | | | | |
|---|---|---|---|---|
| 4,605,347 A * | 8/1986 | Jodock et al. | | 408/224 |
| 4,645,389 A * | 2/1987 | Maier | | 408/230 |
| 5,011,342 A * | 4/1991 | Hsu | | 408/224 |
| 5,056,967 A * | 10/1991 | Hageman | | 408/230 |
| 5,173,014 A * | 12/1992 | Agapiou et al. | | 408/59 |
| 5,273,380 A * | 12/1993 | Musacchia | | 408/230 |
| 5,288,183 A * | 2/1994 | Chaconas et al. | | 408/211 |
| 5,442,979 A * | 8/1995 | Hsu | | 76/108.6 |
| 5,452,971 A * | 9/1995 | Nevills | | 408/230 |
| 5,947,659 A * | 9/1999 | Mays | | 408/211 |
| 5,967,712 A * | 10/1999 | Magill et al. | | 408/227 |
| 6,443,674 B1 * | 9/2002 | Jaconi | | 408/1 R |
| 6,923,602 B2 * | 8/2005 | Osawa et al. | | 408/230 |

FOREIGN PATENT DOCUMENTS

| | | | | |
|---|---|---|---|---|
| EP | 278288 | A1 * | 8/1988 | |
| FR | 2583667 | A1 * | 12/1986 | |
| FR | 2829715 | A1 * | 3/2003 | |
| JP | 02237709 | A * | 9/1990 | |
| JP | 03117507 | A * | 5/1991 | |
| JP | 06015512 | A * | 1/1994 | |
| JP | 06246522 | A * | 9/1994 | |
| JP | 07096411 | A * | 4/1995 | |
| JP | 09277109 | A * | 10/1997 | |
| JP | 10109210 | A * | 4/1998 | |
| JP | 2000042818 | A * | 2/2000 | |
| JP | 2000263306 | A * | 9/2000 | |
| JP | 2002172508 | A * | 6/2002 | |
| JP | 2002361509 | A * | 12/2002 | |
| JP | 2004074391 | A * | 3/2004 | |
| SU | 1060344 | A * | 12/1983 | |
| SU | 1502228 | A * | 8/1989 | |
| WO | WO 2007143883 | A1 * | 12/2007 | |

* cited by examiner

DRILL BIT WITH HIGH PERFORMANCE FOR CHIP REMOVAL

TECHNICAL FIELD

This utility relates to a processing tool. More particularly, this utility relates to a metal processing tool, to be specific, a drill bit with high performance for chip removal.

BACKGROUND OF THE INVENTION

There has been little in the structure and shape of conventional twist drill during the past 100 years or more following its birth; with the continuous development of science and technology and mushrooming of new materials, higher requirements are imposed on solid drilling. However, conventional twist drills suffer from the following main problems:

1. Values of front angles of different points on the main cutting edge vary significantly and the front angles become negative around the drill core, leading to poor cutting conditions.

2. The chisel edge is too long with a very large cutting edge angle, which is a very large negative front angle, leading to poor cutting conditions. Hence, the axial resistance is large and the centering is not good.

3. The main cutting edge is long, the cutting is wide, the chips roll into wide spiral chips, the space occupied is large, making it difficult to remove the chips and for the cutting fluid to flow in.

SUMMARY OF THE INVENTION

In view of the above problems, this utility provides a drill bit to effectively solve the above problems, for instance, improving chip removal to enable the cutting fluid to flow in and reducing the temperature of the cutting edge so that the drill plunges into the workpiece rapidly, therefore improving the working efficiency.

To achieve the above objectives, this utility adopts the following technical proposals: drill bit with high performance for chip removal, comprising a drill tip and a drill body; said drill tip, including the drill core, back edge, tooth and back groove edge, wherein said tooth is a crescent circular groove; there is a trapezoidal or triangle main cutting edge face between said tooth and said back edge; said back groove edge is processed into the plane secondary back face through polishing; said secondary back face intersects said tooth and drill core into the tooth face; said secondary back face intersects said tooth plane.

The angle between said tooth plane and said secondary back face is 60-120 degrees.

The characteristic of the above drill bit with high performance for chip removal is: polish two symmetrical crescent circular grooves, namely teeth on the drill tip of a conventional twist drill to form '⌒/⌒' 3-tip, 7-edge' shape with recessed drill tip and two side tips existing together, further polish the back groove edge to form the secondary back face and polish the tooth at the intersection between the secondary back face and the drill core & tooth to form the tooth plane, which intersects the secondary back face.

The above processings are symmetrical processings.

Since this utility adopts the above technical proposals, it has the following advantages:

1. Reduces the drilling resistance. For instance, reduce the axial force by about 30% and the torque by about 15% when compared with common twist drill.

2. Makes it easy for the cutting fluid to flow into the cutting area, reduces cutting heat and reduces the temperature of the cutting edge.

3. Reduces wear of the cutting edge and improves durability of the drill, therefore improving the production efficiency by 3-5 times.

4. Improves chip removal and broken chips and enables safer operation.

5. The drill plunges into the workpiece rapidly and the centering is good.

In the above figures, 1 is the drill core, 2 is the tooth plane, 3 is the main cutting edge face, 4 is the tooth (crescent circular groove), 5 is the back edge, 6 is the back groove edge and 7 is the secondary back face.

DETAILED DESCRIPTION OF THE DRAWINGS

Figure 1:
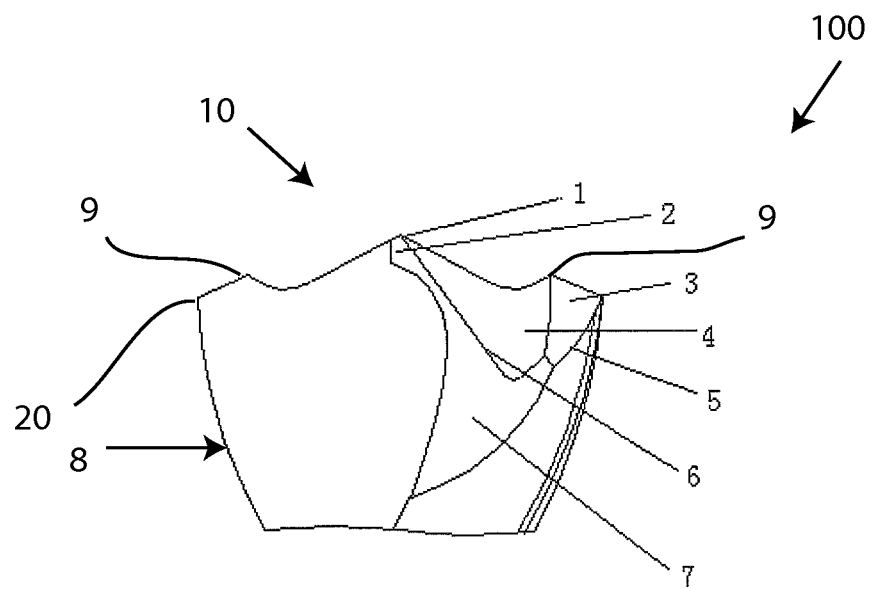
FIG. 1 is a structural schematic of drill tip portion of this new type of drill bit with high performance for chip removal.
Figure 2:
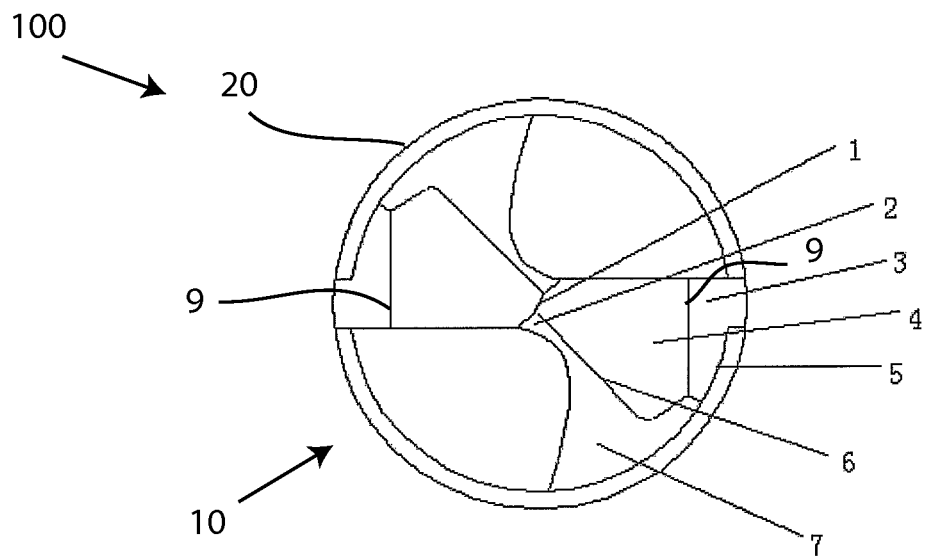
FIG. 2 is a structural schematic of drill tip portion of this new type of drill bit with high performance for chip removal (top view of FIG. 1).

Referring to FIGS. 1 and 2, an embodiment of a drill bit 100 includes a drill tip 10 and a drill body 8. Drill tip 10 includes a drill core 1, a tooth plane 2, a main cutting edge face 3, a tooth 4, a back edge 5, a back groove edge 6, and a secondary back face 7. Embodiments of drill tip 10 include two tooth planes 2, main cutting edge face 3, tooth 4, back edge 5, back groove edge 6, and secondary back face 7. For instance, the drill tip 10 consists of two teeth 4 (i.e. no more than two teeth having a concave surface) for facilitating escape of chips while in operation. For example, components of the drill tip 10, with the exception of the drill core 1, shows a symmetrical relationship with its like component. Drill tip 10 shows a drill tip for a drill bit, or similar device. Drill tip 10 shows an outer edge 20, which may have the largest diameter of the drill tip 10. The outer edge 20, as shown in FIG. 2, may also define an outer circumference of the drill tip 10 and/or drill bit 100.

Moreover, embodiments of a drill bit 100 shows drill tip 10 and a drill body 8, the drill tip 10 including a drill core 1, a back edge 5, a tooth 4, and a back groove edge 6, a main cutting edge face 3 between the tooth 4 and the back edge 5, the back groove edge 6 being processed into a plane secondary back face 7, the secondary back face 7 intersects the tooth 4 and the drill core 1 into a tooth plane 2, wherein the secondary back face 7 intersects the tooth plane 2, and a plurality of side tips 9, wherein said plurality of side tips 9 are located proximate an outer edge 20 of said drill tip 10 and defined by surfaces of the tooth 4 and the main cutting edge face 3, wherein the tooth 4 has a concave surface starting at the drill core 1 and running proximate a longitudinal axis of the drill tip 10 and terminating proximate or at the main cutting edge face 3), wherein the drill tip 10 consists of two of said tooth 4 having a concave surface.

Referring now to FIG. 1, the tooth 4 shows a tooth having a concave surface. Specifically, the tooth 4 may be a concave surface circular crescent groove, wherein the profile of tooth 4 may be concave shaped, inwardly rounded, and the like. The concave shape of the tooth 4 begins at the drill core 1 and extend from the drill core 1 and towards a lower part of the drill body 8 and the outer edge 20 of the drill tip 20, and eventually curve back upwards towards a higher part of the drill body 8 (although still towards the outer edge 20) to form a portion of a side tip 9, as shown in FIG. 1. Furthermore, the tooth 4 shows a concave surface starting at the drill core 1 and running proximate the longitudinal axis of the drill tip 10 and terminating proximal or at the main cutting edge face 3). The concave surface of the two teeth 4 has a smooth surface, having no edges, breaks, normal planes extending therefrom, protrusions, or detents. For example, the surface of the tooth 4 is uninterrupted. The drill core 1 is at the center or midpoint of the drill bit 100, from which the tooth 4 extends or originates (e.g. proximate a longtiduinal axis of the drill tip 10.

Moreover, embodiments of a drill bit 100 shows a drill tip 10 having a plurality of side tips 9. In many embodiments, the drill bit 100 shows two side tips 9, along with the drill core 1 which is considered a tip or peak of the drill bit 100. The plurality of side tips 9, as depicted in FIGS. 1 and 2, is located proximate the outer edge 20 of the drill tip 10. The plurality of side tips 9 can be a peak, a tip, and the like. A portion of the tooth 4 and the main cutting edge face 3 form a side tip 9. For instance, a portion of the tooth 4 and a portion of the main cutting edge face 3 rise and join to form a side tip 9. Furthermore, the side tips 9 are separated from the drill core 1 by concave surface of the tooth 4.

The Following Examples Serve to Further Illustrate the Utility:

EXAMPLE 1

As shown in FIGS. 1 and 2, polish the tooth 4 on the drill tip 10 of a conventional twist drill to obtain two symmetrical crescent circular grooves and a trapezoidal main cutting edge face 3 between the tooth 4 and the back groove edge 5 to form a ' ∧∕∨∧ ' 3-tip, 7-edge' shape with recessed drill tip and two side tips 9 existing together, further polish the back groove edge 6 to form the secondary back face 7, which interests drill core 1 and the tooth 4 and polish the tooth 4 at the intersection between the secondary back face 7 and the drill core 1 and tooth 4 to form the tooth plane so that the angle between the secondary back face 7 and the tooth plane is 60 degrees.

EXAMPLE 2

A drill bit with high performance for chip removal same as example 1 except the main cutting edge face 3 between said tooth face and said back edge 5 is a triangle.

EXAMPLE 3

A drill bit with high performance for chip removal same as example 1 except that the angle between said secondary back face 7 and said tooth plane is 120 degrees.

EXAMPLE 4

A drill bit with high performance for chip removal same as example 1 except that the angle between said secondary back face 7 and said tooth plane is 90 degrees.

The drill bit 100 with high performance for chip removal obtained through the above processings: Reduces the drilling resistance. For instance, reduces the axial force by about 30% and the torque by about 15% when compared with common twist drill; Makes it easy for the cutting fluid to flow into the cutting area, reduces cutting heat and reduces the temperature of the cutting edge; Reduces wear of the cutting edge and improves durability of the drill, therefore improving the production efficiency by 3-5 times; Improves chip removal and broken chips and enables safer operation; The drill plunges into the workpiece rapidly and the centering is good.

In addition to the above examples, this invention may have other implementation methods. Any technical proposal formed through equivalent replacement or change falls within the required scope of protection of this invention.

I claim:

1. A drill bit with high performance for chip removal, consisting of:
    a drill tip and a drill body, said drill tip including a drill core, a back edge, a tooth, and a back groove edge;
    a main cutting edge face between said tooth and said back edge, said back groove edge is processed into a plane secondary back face, said secondary back face intersects said tooth and said drill core into a tooth plane, said secondary back face intersects said tooth plane; and
    two side tips, wherein said two side tips are located proximate an outer edge of said drill tip and defined by surfaces of said tooth and said main cutting edge face, wherein a surface of the tooth originates at said drill core and runs proximate a longitudinal axis of said drill tip and terminates proximate said main cutting edge face, wherein said surface of the tooth is concave;
    wherein the drill tip consists of two of said tooth having concave surfaces;
    wherein the drill tip consists of no more than three tips;
    wherein, where the main cutting edge face touches the outer edge of the drill tip, only the surface of the main cutting edge face and the surface of the tooth connect the outer edge of the drill tip with the drill core.

2. A drill bit with high performance for chip removal according to claim 1, wherein the angle between the said secondary back face and said tooth plane is 60-120 degrees.

* * * * *

UNITED STATES PATENT AND TRADEMARK OFFICE
CERTIFICATE OF CORRECTION

PATENT NO. : 8,807,887 B2  
APPLICATION NO. : 11/911579  
DATED : August 19, 2014  
INVENTOR(S) : Xiaokun Zhu Page 1 of 1

It is certified that error appears in the above-identified patent and that said Letters Patent is hereby corrected as shown below:

On the Title Page item (75) Inventor:  
Delete "Danyan" and insert  
--Jiangsu--

Signed and Sealed this  
Twenty-seventh Day of January, 2015

Michelle K. Lee  
*Deputy Director of the United States Patent and Trademark Office*